Nov. 12, 1940.　　　　J. W. HALE　　　　2,221,092
CHANGE SPEED DEVICE
Filed Aug. 24, 1936
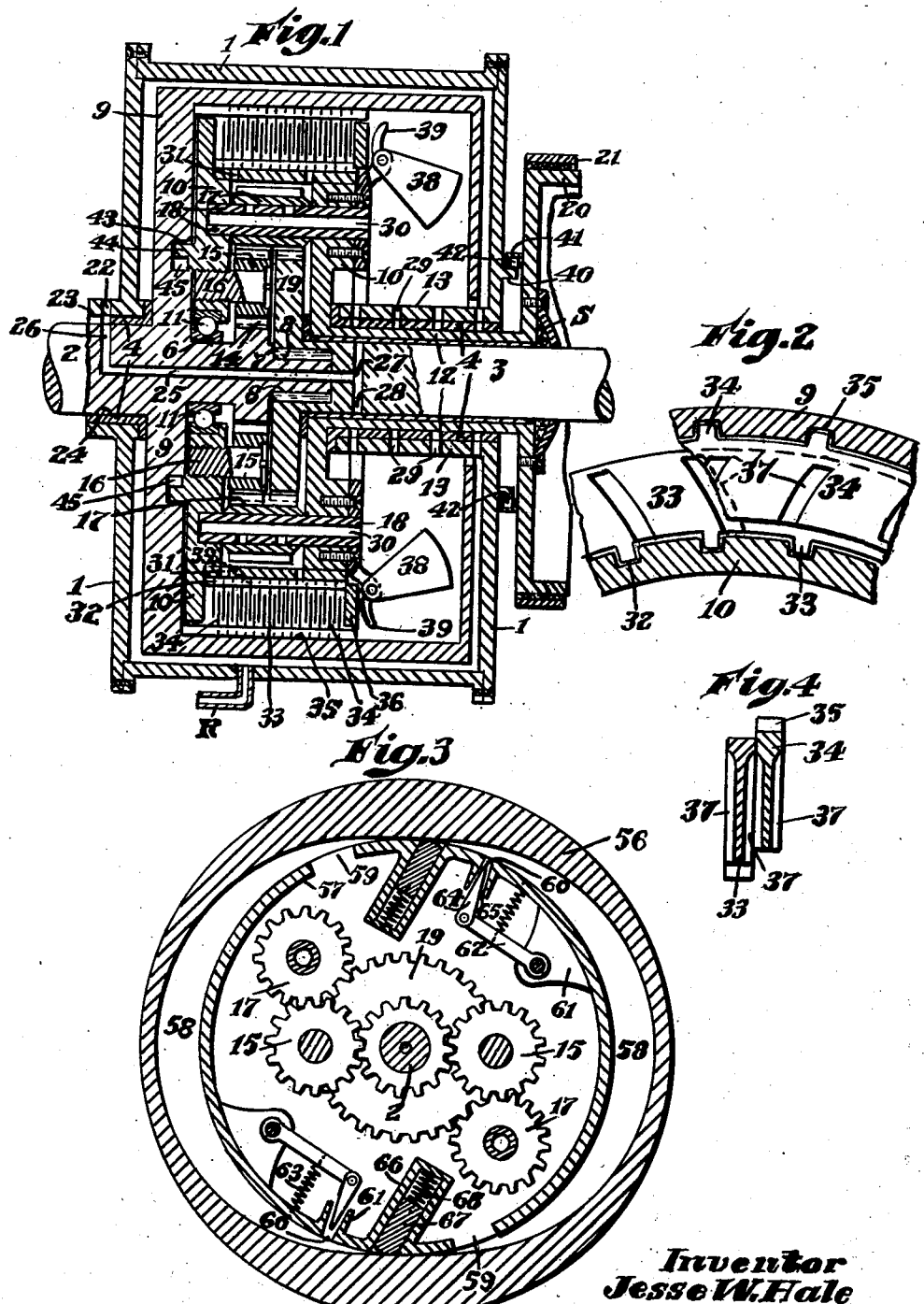
Inventor
Jesse W. Hale
By Attorney Patented Nov. 12, 1940

2,221,092

UNITED STATES PATENT OFFICE 2,221,092

CHANGE SPEED DEVICE

Jesse W. Hale, Newton Center, Mass.

Application August 24, 1936, Serial No. 97,560

13 Claims. (Cl. 74—293)

My present invention relates to improvements in devices adapted to connect a drive shaft and a driven shaft at a ratio dependent on the drive shaft speed and the driven shaft torque.

In my present invention, I utilize an idler assembly to connect the drive and driven shafts and the assembly is mounted for rotation independently thereof and in the same direction as the drive shaft but at a reduced speed. A coupling, preferably hydraulic, is adapted to be actuated by governors responsive to the speed of the assembly to induce rotation of the assembly with the drive shaft at a ratio consistent with the drive shaft torque.

Certain advantages of my invention may be mentioned. A reverse is provided by the use of a brake to limit and prevent rotation of the assembly, while, when the assembly is unrestrained, the governors have substantial speed even during idling speeds. My invention utilizes such a simple construction that my device is extremely well adapted for use in connecting a drive shaft to a driven shaft at ratios depending on drive shaft speed and driven shaft torque.

In the accompanying drawing I have shown embodiments of my invention particularly adapted for use in motor vehicles. From a consideration of this drawing and the accompanying specification the full nature of my invention and its many advantages may be readily appreciated.

In the drawing:

Fig. 1 is a longitudinal section of one form of my invention.

Fig. 2 is a fragmentary view of the coupling means used therein.

Fig. 3 is a view in cross section of my invention showing a modified form of coupling means, and Fig. 4 is a sectional view showing the pockets in coupling members as shown in Fig. 2.

In my invention I use a casing 1 which has ports to receive the drive shaft 2 and the driven shaft 3. Suitable bushing for the shafts 2 and 3 and other parts later to be described are indicated by the reference numeral 4.

The drive shaft 2 is of reduced diameter at 6 and is of further reduced diameter at 7 so that the portion 7 and roller bearings 8 may enter the bored end of the driven shaft 3. Forwardly of the portion 6, a housing 9 is carried by the drive shaft. A second housing 10 is separated from the portion 6 by bearings 11. The housing 10 includes a sleeve 12 which is confined by the extended hub 13 of the casing 1 from which hub the sleeve 12 is separated by a bushing 4.

A gear 14 is mounted on the portion 6 of the drive shaft 2. The gear 14 meshes with an idler gear 15 rotatably mounted on a shaft 16 carried by the housing 10. A second idler gear 17, rotatably carried on a shaft 18 in the housing 10, is in mesh with the gear 15 and the gear 19 on the driven shaft 3. It will be noted that the housing 10 is freely rotatable and that the gear train described is effective to rotate the housing 10 in the same direction as the drive shaft at a reduced speed determined by the ratio established by the gears used.

Rearwardly of the casing 1, the sleeve 12 is formed with a drum 20 adapted to be held against rotation as by a brake indicated at 21.

From a suitable source such as the crank case of an engine oil under pressure is delivered to the conduit 22 through the casing hub 23. The shaft 2 is provided with a ring groove 24 which is connected to the axial conduit 25 by branch conduits indicated at 26. The conduit 26 registers with the conduit 27 on the driven shaft 3. The conduit 27 includes openings 28 to the surface of the shaft 3 to insure adequate lubrication. For the same reason, the hub 13 is provided with oil holes 29 and the shaft 18 bored as at 30. The housing 10 is provided with oil outlets 31 while the housing 9 almost contacts the hub 13 insuring an adequate oil supply therein. A return oil conduit to its source is indicated at R. Oil retainers are indicated at S. Slidably splined in grooves 32 on the outer surface of the housing 10 are a plurality of members 33 adapted to engage members 34 similarly mounted in grooves 35 on the inner surface of the housing 9 when the splined ring 36 is subjected to pressure. The coupling members 33 and 34 are adequately lubricated and are preferably formed with opposed pockets 37 which are inclined in opposite directions to provide hydraulic reaction (see Figs. 2 and 4).

Mounted on the housing 10 are governors 38 which include cam shaped arms 39 disposed to actuate the coupling means by sliding the ring 36 against the members 33 and 34. The arms 39 are formed as cams to increase the leverage as the governors 38 are influenced by centrifugal force.

In order to prevent the reverse rotation of the housing 10, I mount an annular ring 40 on the rear of the casing 1 which is surrounded by an annular ring 41 on the front of the drum 20. The ring 41 includes conventional one-way clutches indicated by the reference numeral 42.

I also form the inner face of the housing 9 with a recess 43 which receives an annular flange 44 carried by the housing 10. The flange 44 includes one way clutch members indicated at 45 of conventional design to prevent the housing 10 from rotating faster than the drive shaft 2.

In operation, when the drive shaft 2 is rotating at an idling speed, the housing 10 is rotating in the same direction as the drive shaft and at a reduced speed ineffective to cause the governors 38 to exert pressure on the coupling means, the ring 36 and the oil coated coupling members 33 and 34.

On an increase in drive shaft speed, the speed of rotation of the housing 10 increases proportionately and the arm 39 of the governors 38 exert a pressure on the coupling means. It may be assumed that the torque on the driven shaft 3 is great and therefore the members 33 and 34 slip until on higher speeds of the housing 10, the action of the governors 38 is effective to induce rotation of the housing 10 with the housing 9 to establish a slow forward rotation of the driven shaft 3 at a ratio dependent on drive shaft speed and driven shaft torque. As an increased speed of rotation of the housing 10 is always accompanied by an increased pressure by the governor, the ratio will be consistently varied until the housings 9 and 10 are rotated together, effecting a direct drive.

The operation of my device may be most readily understood by first considering that the housing 10 containing the idler assembly utilized in my invention if restrained from rotating in the same direction as the drive shaft 2 as by means of the brake 21 results in a reverse drive of the driven shaft 3 at a ratio dependent on the particular gear ratio provided. This ratio may be assumed to be 2.1.

If the housing 10 is unrestrained, it, therefore, rotates in the same direction and at one half the speed of the drive shaft 2.

Assuming the clutches 33, 34 to be fully engaged so that the housings 9 and 10 are locked together, the drive shaft 2 and the driven shaft 3 are rotated together establishing direct drive. When the clutches 33, 34 are not engaged sufficiently to lock the housings 9 and 10 together, the effect on the driven shaft 3 depends on the extent of the engagement of the clutches 33, 34, which is dependent on the torque of the driven shaft 3.

So long as the ratio of rotation of the housing 10 is varied by accelerating engagement with the housing 9, the gear 18 is effective to rotate the gear 19 on the driven shaft 3 at a ratio depending on the extent of the accelerating engagement of the housings 9 and 10.

While the coupling of the housings 9 and 10 is effected by centrifugal force based on the rate of rotation of the housing 10, the effectiveness of the governor is subject to the driven shaft torque since its ability to actuate the clutches 33, 34, to accelerate the rate of rotation of the housing 10 faster than permitted by the gear ratio employed, is always subject to the driven shaft torque.

As my coupling comprises a multiplicity of members 33 and 34 subjected to light pressure, it will be appreciated that the coupling members will be separated by a film of oil under normal operating conditions.

In the form of my invention shown in Fig. 3 I have shown a modification of my invention in which alternate means are used to couple the housing 57 with the housing 56 which are analogous to housings 10 and 9 as shown in Fig. 1 to effect the same method of operation as that previously discussed. As is shown in Fig. 3, the housing 56 is provided with longitudinal pockets 58 while the housing 57 is provided with an opening 59 to each pocket 58 and a slotted orifice 60 from each pocket 58 to the housing 57.

Adjacent the slotted orifice or ports 60 are mountings 61 carried on the inner surface of the housing 57 to which are pivoted an arm 62 under the influence of a spring 63. The arm 62 carries a wedge shaped member 64 adapted to enter the wedge shaped mouth 65 of the port 60. Adjacent each inlet 60 is a casing 66 which is inclined forwardly in the direction of rotation as shown in the drawing to act as a scoop and impeller to force the oil into the opening 60 adjacent thereto. In each of the casings 66 is mounted a piston 67 which is maintained in contact with the housing 56 by a spring 68.

In operation it will be appreciated that the housing 57 is rotated by the idler assembly in the same direction as the housing 56 but at a reduced speed. The gear train is indicated in Fig. 3 using the same numerals or references as those employed to designate the gears in the idler assembly described in detail in connection with the embodiment of my invention shown in Fig. 1.

Oil is driven outwardly through the outlets 59 by centrifugal force and into the pockets 58 from which it returns to the interior of the housing 57 through the orifice or port 60. As the speed of rotation increases centrifugal force urges the members 64 into the mouth 65 of the orifice 60 tending to restrict the flow of oil therefrom. At the same time it will be noted that the pistons 67 are likewise responsive to centrifugal force and as the pockets 58 include an outlet 60 and the next adjacent orifice 59 the piston 67 is carried into the pocket 58 to block the flow of oil through the outlets 59 and also act to direct the oil in the pockets 58 towards the orifice 60. As the centrifugal force increases, the flow through the inlet 60 is restricted building up a pressure in the pockets 58 and against the pistons 67 inducing rotation of the housing 57 with the housing 56 so that the driven shaft 3 is rotated at a ratio dependent on driven shaft torque and drive shaft speeds. When the flow of oil through the orifice or port 60 is completely blocked the housings 57 and 56 rotate together to effect direct drive.

It is obvious that if the driven shaft 3 is held against rotation by sufficient torque, the engine speed can be brought up to any desired speed and the idler carrier will rotate at one-half the speed of the drive shaft and fluid will circulate through the governor actuated valve. As centrifugal force varies as the square of the speed, the resistance opposed to the relief of the fluid through the governor actuated valve varies in like manner. When the torque of the driven shaft 3 is met, the housing 10 rotates at a proportionately increased speed or faster than one-half the speed of the drive shaft 2 consequently exerting increased centrifugal force to close the governor valve.

It will be understood that the housing 56 is rotating in the same direction counterclockwise as viewed in Fig. 3 and faster than the housing 57 until the two are rotated together. The portions of the housing 56 between the pockets 58, therefore, close the inlets 59 and force the oil through the outlets 60 until centrifugal force on the members 64 close said outlets. The pistons 67 prevent at all times the escape of oil through the adjacent outlet.

In accordance with my invention an effective device is provided in which simplicity and desirability of construction are combined with flexibility of operation.

What I therefore claim and desire to secure by Letters Patent is:

1. In a variable ratio changing device, a drive shaft, a driven shaft, a housing carried by said drive shaft, a second housing overlying said shafts and being positioned within said first housing, said second housing being mounted on said shafts for independent rotation, means to rotate said second housing in the same direction as said drive shaft at a reduced speed, means to induce rotation of said second housing with said first housing, and means responsive to the speed of said second housing to actuate said last named means.

2. In a variable ratio changing device, a drive shaft, a driven shaft, a freely rotatable housing overlying said shafts, an idler assembly carried by said housing connecting said shafts, said idler assembly being effective to rotate said housing in the same direction as said drive shaft, a housing carried by said drive shaft overlying said first-named housing, a plurality of coupling members slidably carried on each of said housings, a source of oil communicating with said members, speed responsive means carried by said assembly and being adapted to exert pressure on said members.

3. In a variable ratio changing device, a drive shaft, a driven shaft, an independently rotatable housing overlying said shafts, means to rotate said housing in the same direction as said drive shaft at a reduced speed, a housing carried by said drive shaft overlying said first housing, said second housing being formed with eccentric pockets, a source of oil in communication with said first-named housing, and means to permit the flow of oil out of said first-named housing into said pocket and the return of said oil into said first-named housing, and centrifugally controlled means to confine said oil in said pockets to induce rotation of said first housing with said second housing as determined by driven shaft torque and drive shaft speed.

4. In a variable ratio changing device, a drive shaft, and a driven shaft, an independently rotatable housing overlying said shafts, means to rotate said housing in the same direction as said drive shaft but at a reduced speed, a housing carried by said drive shaft overlying said first housing, said housing being provided with longitudinal pockets, a source of oil in communication with said first housing, said first housing being provided with an outlet and an inlet for each pocket, centrifugally controlled means in control of each outlet, and a casing between each of said outlets and the next inlet to entrap oil during rotation, and a sliding piston in said casing.

5. In a variable ratio changing device, a drive shaft, and a driven shaft, an independently rotatable housing overlying said shafts, means to rotate said housing in same direction as said drive shaft but at a reduced speed, a housing carried by said drive shaft overlying said first housing, said housing being provided with longitudinal pockets, a source of oil in communication with said first housing, said first housing being provided with an outlet and an inlet for each pocket, centrifugally controlled means in control of each outlet, and a casing between each of said outlets and the next inlet to entrap oil during rotation, a sliding piston in said casing, and a spring in control of said piston.

6. In a variable ratio changing device, a drive shaft, and a driven shaft, an independently rotatable housing overlying said shafts, means to rotate said housing in the same direction as said drive shaft but at a reduced speed, a housing carried by said drive shaft overlying said first housing, said housing being provided with longitudinal pockets, a source of oil in communication with said first housing, said first housing being provided with an outlet and an inlet for each pocket, centrifugally controlled means in control of each of said outlets, and a casing between each of said outlets and the next inlet, a sliding piston in said casing, to enter said pockets and to be reacted upon by entrapped oil to induce rotation of said first housing with said second housing, and each of said piston casings being inclined to act as an impeller during rotation of said first housing.

7. In a variable ratio changing device, a drive shaft and a driven shaft, a housing overlying said shafts, means effective to rotate said housing at a reduced speed in the same direction as said drive shaft, a housing carried by said drive shaft, hydraulic means adapted to interlock said housings, and means responsive to the speed of said first housing to control said hydraulic means.

8. In a device as claimed in claim 1 in which the means to induce rotation of said second housing with said first housing comprise a plurality of pairs of members, one member of each pair being slidably carried on each housing, each of said members being formed with a plurality of oil receiving pockets, and a source of fluid to said members.

9. In a device as claimed in claim 1 in which the means to induce rotation of said second housing with said first housing comprise a plurality of pairs of members, one member of each pair being slidably carried on each housing, each of said members being formed with a plurality of oil receiving pockets, said pockets in said pairs being oppositely inclined, and a source of fluid to said members.

10. In a variable ratio changing device, a drive shaft, a driven shaft, a freely rotatable idler assembly connecting said shafts and adapted to rotate in the same direction as but slower than said drive shaft when unrestrained and to rotate said driven shaft in a direction counter to said drive shaft when restrained, a member carried by said drive shaft, means to variably couple said assembly and said member so that said driven shaft is rotated in the same direction as said drive shaft at a ratio dependent on the effectiveness of said coupling means, and means responsive to the speed of said assembly to actuate said coupling means so that ratios established are dependent on driven shaft torque and drive shaft speeds.

11. In a variable ratio changing device, a drive shaft, a driven shaft, a freely rotatable idler assembly connecting said shafts and adapted to rotate in the same direction as but slower than said drive shaft when unrestrained and to rotate said driven shaft in a direction counter to said drive shaft when restrained, means to hold said assembly against rotation, a member carried by said drive shaft, means to variably couple said assembly and said member so that said driven shaft is rotated in the same direction as said drive shaft at a ratio dependent on the effectiveness of said coupling means, and means responsive to the speed of said assembly to actuate said coupling means so that ratios established are dependent on driven shaft torque and drive shaft speeds.

12. In a variable ratio changing device, a drive shaft, a driven shaft, a freely rotatable idler assembly connecting said shafts adapted to rotate in the same direction as but slower than said drive shaft when unrestrained and to rotate said driven shaft in a direction counter to said drive shaft when restrained, a member carried by said drive shaft, means to couple said assembly and said member so that said driven shaft is rotated in the same direction as said drive shaft at a ratio dependent on the effectiveness of said coupling means, said coupling means comprising clutch members carried by said assembly and clutch members carried by said drive shaft member, a source of fluid in communication with said clutch members, and means responsive to the speed of said assembly to exert pressure on said clutch members so that ratios established are dependent on driven shaft torque and drive shaft speeds.

13. In a variable ratio changing device, a drive shaft, a driven shaft, a freely rotatable idler assembly connecting said shafts adapted to rotate in the same direction as but slower than said drive shaft when unrestrained and to rotate said driven shaft in a direction counter to said drive shaft when restrained, a member carried by said drive shaft, a centrifugally operated hydraulic coupling between said assembly and said member, said coupling consisting of members to induce impact of the fluid to effect a gradual coupling of said assembly and said drive shaft member to rotate the driven shaft in the same direction as said drive shaft at a ratio dependent on the effectiveness of said coupling.

JESSE W. HALE.